(12) United States Patent
Gaied

(10) Patent No.: US 12,270,086 B2
(45) Date of Patent: Apr. 8, 2025

(54) METHOD FOR IMPROVING THE FORMABILITY OF STEEL BLANKS

(71) Applicant: ArcelorMittal, Luxembourg (LU)

(72) Inventor: Sadok Gaied, Saint-Maximin (FR)

(73) Assignee: ArcelorMittal, Luxembourg (LU)

( * ) Notice: Subject to any disclaimer, the term of this patent is extended or adjusted under 35 U.S.C. 154(b) by 662 days.

(21) Appl. No.: 17/271,161

(22) PCT Filed: Aug. 30, 2019

(86) PCT No.: PCT/IB2019/057323
§ 371 (c)(1),
(2) Date: Feb. 24, 2021

(87) PCT Pub. No.: WO2020/049428
PCT Pub. Date: Mar. 12, 2020

(65) Prior Publication Data
US 2021/0180144 A1    Jun. 17, 2021

(30) Foreign Application Priority Data

Sep. 7, 2018  (WO) .................. PCT/IB2018/056841

(51) Int. Cl.
*C21D 1/09* (2006.01)
*C23C 2/06* (2006.01)
*C25D 3/66* (2006.01)

(52) U.S. Cl.
CPC .............. *C21D 1/09* (2013.01); *C23C 2/06* (2013.01); *C25D 3/66* (2013.01); *C21D 2211/001* (2013.01); *C21D 2211/002* (2013.01); *C21D 2211/005* (2013.01); *C21D 2211/008* (2013.01)

(58) Field of Classification Search
CPC ....................................................... C21D 1/09
See application file for complete search history.

(56) References Cited

U.S. PATENT DOCUMENTS

| | | | |
|---|---|---|---|
| 5,918,359 A | 7/1999 | Neuenschwander et al. | |
| 6,185,977 B1 | 2/2001 | Schiessl et al. | |
| 6,743,307 B1 | 6/2004 | Engl et al. | |
| 10,455,648 B2 | 10/2019 | Hino et al. | |
| 2012/0237387 A1 | 9/2012 | Santacreu | |
| 2015/0075678 A1 | 3/2015 | Kim et al. | |
| 2017/0008059 A1 | 1/2017 | Marks | |
| 2017/0137906 A1 | 5/2017 | Fan et al. | |
| 2017/0233847 A1* | 8/2017 | Masse | C21D 1/26 148/518 |
| 2020/0078853 A1 | 3/2020 | Denks et al. | |

FOREIGN PATENT DOCUMENTS

| | | |
|---|---|---|
| CN | 106471147 A | 3/2017 |
| DE | 19653543 | 6/1998 |
| EP | 2561946 | 2/2013 |
| JP | S6086214 | 5/1985 |
| JP | H0987737 | 3/1997 |
| JP | 2001323318 A | 11/2001 |
| JP | 2009149970 A | 7/2009 |
| JP | 2017186586 A | 10/2017 |
| KR | 20110040021 | 4/2011 |
| RU | 2246552 C2 | 2/2005 |
| RU | 2501866 C1 | 12/2013 |
| RU | 2600773 C2 | 10/2016 |
| WO | WO2011033180 | 3/2011 |
| WO | WO2013013305 | 1/2013 |
| WO | WO2016113388 | 7/2016 |
| WO | WO2018091038 A1 | 5/2018 |

OTHER PUBLICATIONS

International Search Report of PCT/IB2019/057323, dated Nov. 18, 2019.
Georg Bergweiler et al., "Improvement of formability and performance of coated ultra-high-strength steels by local heat treatment using a high power diode laser", Proceedings: 2nd International Conference Super-High Strength Steels, Italy, Milano, (Jan. 1, 2010).
Baumann Markus et al., "Local heat treatment of high strength steels with zoom-optics and 10kW-diode laser", High Power Laser Materials Processing: Lasers, Beam Delivery, Diagnostics, and Applications, Spie, 1000 20th St. Bellingham WA 98225-6705 USA, (Feb. 9, 2012), vol. 8239, No. 1.
R. Neugebauer, S. Scheffler, R. Poprawe, A. Weisheit, "Local laser heat treatment of ultra high strength steels to imrpove formability", Prod. Eng. Res. Devel., (2009).
M. Asadi, G. Frommeyer, A. Aghajani, I. Timokhina, H. Palkowski, "Local Laser Heat Treatment in Dual-Phase Steels", Metallurgical and Materials Transactions A, (Apr. 2012), vol. 43A.

\* cited by examiner

*Primary Examiner* — Jophy S. Koshy
(74) *Attorney, Agent, or Firm* — Davidson Kappel LLC

(57) ABSTRACT

A method to improve the formability of steel blanks, for steels containing at least 5% martensite, and possibly some ferrite, bainite and residual austenite and having an ultimate tensile strength of at least 500 MPa and possibly having a metallic coating layer on at least one side, wherein the steel blank is heat-treated on at least part of its peripheral thickness using at least one heat source, which heats the steel in a heat-treated zone to a temperature between 400° C. and 1500° C. without melting the steel in any points of the heat-treated zone.

18 Claims, 5 Drawing Sheets

METHOD FOR IMPROVING THE FORMABILITY OF STEEL BLANKS

The invention deals with a method for improving the formability of High Strength Steels (HSS).

BACKGROUND

HSS have an ultimate tensile strength above 500 MPa and contain at least 5% martensite, the remainder consisting of a combination of other phases such as ferrite, bainite or residual austenite. Because they offer the possibility to improve the fuel efficiency and crashworthiness of vehicles, their use in the automotive industry, among others, is steadily increasing.

HSS are shaped into parts by forming a steel blank, for example by stamping or bending or roll forming said steel blank. Because of the very high hardness gradient between the different phases they contain, HSS are particularly sensitive to the formation of cracks during forming. More particularly, HSS are very sensitive to the formation of cracks which are initiated on the edge of the blank and which can then propagate inside the final part, rendering the part unfit for use. Indeed, the cut edge of a blank combines two critical mechanical conditions, which make them particularly sensitive to crack formation during deformation. The first condition is the strain distribution on the cut edges, which is a plane strain distribution, considered the most critical for forming and hence the most susceptible to crack formation. The second condition is the hardening of the edge induced by the process of cutting the blank before forming it. For example, when using mechanical cutting, the action of cutting is actually a combination of shearing and of tearing of the steel material, which induces a significant amount of internal stresses and therefore of work hardening of the material at the edge and the periphery of the blank. The steel material in this area has thus already lost part of its ductility and part of its ability to accommodate the stresses induced by the forming step through deformation instead of through crack formation. For these reasons, the material on the edge and the periphery of a steel blank is particularly prone to crack formation during the forming step.

The sensitivity of a steel blank toward the formation of cracks on the edge during forming can be measured by the hole expansion test, which is defined by the ISO 16630:2017 standard testing method. Said test measures a hole expansion ratio, which is the ratio between the diameter of a hole deformed by a punch at the onset of cracks on the edge of the hole during deformation to the initial diameter of said hole before deformation.

When faced with edge crack issues on a part, the part manufacturer can choose to improve the quality of the edge of the cut blanks, to tune the clearance of the cutting tool, to modify the part design, to modify the blank shape or to change the forming process. It is however not always industrially feasible to make these changes and in any case the edge crack problem can remain after these options have been explored. The only remaining possibility is then to mechanically brush the side of the blanks in the area where crack formation occurs. By relieving the tensions on the edge and periphery of the parts induced by the blank cutting process, mechanical brushing can indeed solve edge crack problems. It however introduces an expensive post treatment step after the blanking operation.

An alternative is to locally modify the properties of the steel in the area of the blanks where cracks occur after forming. Several inventions have been published providing methods to locally modify the properties of steel using a heat source. For example, US2015/0075678 describes a method to improve the formability of steel blanks by irradiating the surface with a Laser beam. JP0987737 describes a method to locally soften high strength steel blanks by heating the surface of the steel using an arc or a laser beam.

SUMMARY OF THE INVENTION

However, there are several limitations associated with heat treating the surface of steel blanks. First of all, the process has low productivity because it can only be performed one blank at a time. Furthermore, when treating metallic coated steel blanks, the high temperature reached at the surface of the blanks will result in significant or total evaporation of the coating. The treated blanks will not benefit from the functions normally ensured by the coating, e.g. corrosion protection or paintability.

The present invention provides a method to improve the formability of a steel blank (1), said steel blank (1) having a microstructure containing at least 5% martensite in area percentage, and possibly some ferrite, bainite and residual austenite and having an ultimate tensile strength of at least 500 MPa and having a metallic coating (14) on at least a portion of an upper face (2) and/or a lower face (4), wherein a heat-treatment operation is performed on the steel blank (1) by directing a thermal energy Q provided by at least one heat source (16) on at least part of a peripheral thickness (6) of said steel blank (1) to form a peripheral heated portion (18) and a heat-treated volume (22), wherein the temperature of said heat-treated volume (22) is comprised within the range of 400° C. to 1500° C., wherein the entire volume of the steel blank (1) stays solid during the heat-treatment operation, and wherein the thickness of the metallic coating (14) after heat treatment in the area covering the heat-treated volume (22) decreases by less than 30% as compared to the thickness of the metallic coating (14) in the areas not covering the heat-treated volume (22).

The present invention thus involves heat treating the blank on at least part of its thickness using a at least one heat source applied to the thickness of the blank, which heats the steel at a temperature between 400° C. and 1500° C. without melting any point of said blank.

Heating the steel blank on at least part of its thickness creates a heat-treated zone in at least part of the edge and the periphery of the steel blank. The thermal energy applied in the heat-treated zone has the effect of relieving the internal stresses coming from the cutting process and therefore has the effect of increasing the ductility of the steel in the heat-treated zone, thereby reducing its sensitivity to crack formation. Furthermore, through the effect of the thermal energy, the microstructure of the steel in the heat-treated zone can also be favorably modified so as to soften the steel in the heat-treated zone, thereby further contributing to the increase in ductility of the steel in the heat-treated zone, thereby further reducing its sensitivity to crack formation.

In case of a coated steel blank, thanks to the fact that the heat treatment is applied on the thickness of the steel blank, the impact of the heat treatment on the coating layer of the steel blank is significantly reduced compared to the impact of a heat treatment which would be directly applied to the surface of the steel blank. Furthermore, because steel generally absorbs energy in a more efficient way than metallic coatings, which are very bright and therefore reflect a high amount of the energy they receive, the thermal efficiency of the heat treatment is improved when applying it to the thickness of the steel sheet, which is comprised mainly of steel, rather than when applying it on the surface, which is comprised only of the metallic coating.

As it will appear in the examples following the description, the current invention has been demonstrated to yield very good results in terms of edge crack improvement, without compromising the overall structural function of the part, without evaporating more than 30% of the coating in case of metallic coated blanks and without further impacting the downstream processes after forming.

The current invention also holds a particular industrial interest in terms of productivity by offering the possibility for example to simultaneously treat a high number of blanks piled in a stack. It also allows for the use of different types of heat sources and can be integrated in different industrial setups, making it very versatile and flexible according to the specific needs of the user.

Another object of the invention is a steel blank that can be obtained by using the method.

BRIEF DESCRIPTION OF THE DRAWINGS

Other characteristics and advantages of the invention will appear through the detailed description which follows, given as a mere example, with reference to drawings.

DETAILED DESCRIPTION

In a first step of the method, a steel blank 1 is provided.

The steel blank 1 is obtained through a blanking step, which takes place prior to the method of the present invention and is therefore not included in the present invention. During the blanking step, the steel material, for example provided as a coil of steel, is cut into steel blanks 1 on a blanking line. The most common and economical technology currently in use in the industry is mechanical cutting. Other technologies include Laser cutting or high-pressure water cutting.

Figure 1:
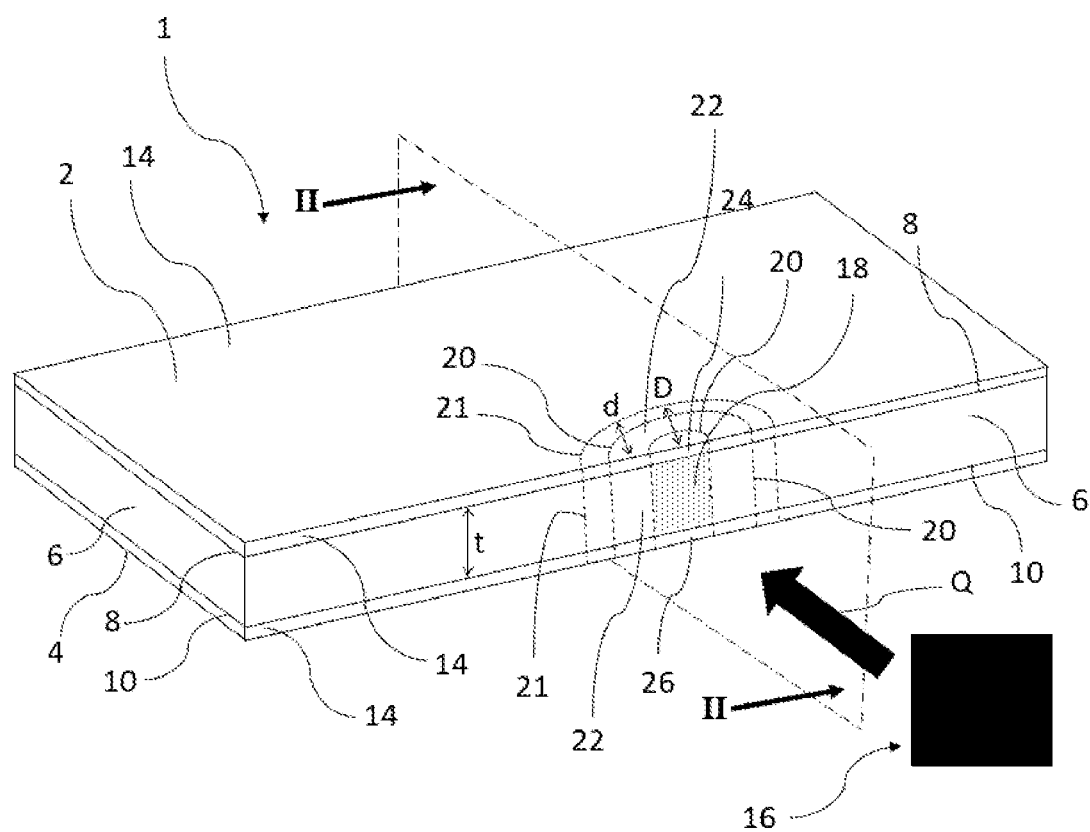
FIG. 1 is a perspective view of a single blank to which the method is applied using a single static heat source.

Referring to FIG. 1, the volume of the steel blank 1 is comprised between two main surfaces, an upper face 2 and a lower face 4, located on the opposite side to said upper face 2. In the following description, the peripheral thickness 6 of the steel blank refers to the surface which runs around the contour of the steel blank 1 and links together the lines formed by the upper outer edge 8 of said upper face 2 and the lower outer edge 10 of said lower face 4. The blank thickness t of the steel blank 1 refers to the distance separating the upper face 2 from the lower face 4.

The blank thickness t can be constant throughout the steel blank 1 or can vary, for example in the case of a tailor welded blank, which comprises for example several steel blanks 1 of different blank thicknesses t, which have been welded together along a portion of their respective peripheral thicknesses 6, or for example in the case of a tailor rolled blank, which comprises within the same steel blank 1 several portions, each having a different blank thickness t.

In a particular embodiment, the steel blank 1 has for example a parallelepipedal shape and a constant blank thickness t, as depicted in FIG. 1. In this case the upper and lower outer edges 8 and 10 both form rectangles. The peripheral thickness 6 of said steel blank 1 consists of four rectangles each abutting the next one along its small side, which has a length equal to the blank thickness t, and each having one long side formed by one of the sides of the upper outer edge 8 and the other long side formed by the one of the sides of the lower outer edge 10.

In another embodiment, the steel blank 1 is comprised of an upper and lower face 2 and 3 having an upper and lower outer edge 8 and 10 which follow a contour similar to that of the final part obtained after forming of the steel blank 1. Such a steel blank 1 is known as a shape blank. The use of a shape blank enables the part manufacturer to reduce or eliminate the amount of side trimming to be done on the final part. When the steel blank 1 is a shape blank, the upper and lower face 2 and 3 have upper and lower outer edges 8 and 10 which can comprise straight and/or curved lines. In this case, the peripheral thickness 6 comprises a series of shapes which are flat rectangles when the corresponding portion of the upper and lower outer edges 8 and 10 are straight lines and which are rectangles having two curved long sides when the corresponding portion of the upper and lower outer edges 8 and 10 are curved lines, each of the shapes comprising the peripheral thickness 6 abutting the next one along its small side and each rectangle having a small side of the same length as the blank thickness t.

At least part of the steel blank 1 is made of a high strength steel (HSS). By HSS it is meant a steel having a tensile strength above 500 MPa. In order to reach such a level of mechanical properties, HSSs have a microstructure which comprises at least 5% in area percent of martensite. HSSs are for example dual phase steels, comprising martensite and ferrite, or complex phase steels, comprising ferrite, martensite, bainite and possibly some residual austenite or Transformation Induced Plasticity (TRIP) steels, comprising ferrite, martensite, residual austenite and possibly some bainite.

The steel blank 1 has for example a blank thickness t comprised between 0.2 mm and 10.0 mm.

In a particular embodiment, as shown in FIG. 1, the steel blank 1 is covered by a metallic coating 14 on at least part of its upper face 2 or part of its lower face 4. FIG. 1 shows a steel blank covered by a metallic coating 14 on both its upper and lower faces 2 and 4. The metallic coating 14 is for example applied to provide corrosion protection to the final part. The metallic coating 14 is for example a zinc based coating such as pure zinc or an alloy comprising zinc and iron or an alloy comprising zinc, aluminum and magnesium. In another example, the metallic coating 14 is an aluminum based coating such as pure aluminum, or an alloy aluminum silicon alloys, or aluminum zinc alloys. The metallic coating is applied for example by hot dip coating or by electrodeposition or by jet vapor deposition. The thickness of the metallic coating layer is comprised for example between 5 microns and 50 microns per face.

The method further comprises a step of performing a heat treatment operation on at least part of the peripheral thickness 6 of the steel blank 1.

The heat treatment operation is performed by directing a thermal energy Q of at least one heat source 16 toward at least part of the peripheral thickness 6 of the steel blank 1, as shown in FIGS. 1 to 5. The thermal energy Q of the heat source 16 has the effect of raising the temperature of the peripheral thickness 6 in the peripheral heated portion 18, which is the area of said peripheral thickness 6 toward which said heat source 16 is directed. By temperature at a given point of the steel blank 1, it is meant the maximum temperature reached in said given point of the steel blank 1 during the heat treatment operation. Thanks to thermal diffusion, the increase in temperature of the peripheral heated portion 18 will cause the surrounding volume of the steel blank 1 to also increase in temperature. During the heat treatment operation, the maximum temperature of the steel blank 1 is reached in the peripheral heated portion 18, because this is where the thermal energy Q from the heat source 16 is first transmitted to the steel blank 1. When measuring the temperature of the steel blank 1 along a line extending from the peripheral heated portion 18 in a perpendicular direction oriented toward the inside of the steel blank 1, said temperature decreases when the distance along said line to the peripheral heated portion 18 increases. In other words, the temperature of the steel blank 1 decreases when travelling inside the steel blank 1 away from the peripheral heated portion 18. The heat treatment operation therefore has the effect of creating a temperature field within the steel blank 1, which has maximum temperature values on the peripheral heated portion 18 and which has decreasing values when travelling away from said peripheral heated portion 18. Said temperature field comprises isotherm planes 20, which are planes extending within the steel blank 1 along which the temperature is constant, as shown on FIGS. 1 and 2. The heat-treated volume 22 is the volume comprised within the steel blank 1 which comprises all the isotherm planes 20 having a temperature above 400° C. In other words, the temperature of all points of the steel blank 1 comprised inside the heat-treated volume 22 is above 400° C., while the temperature of all points of the steel blank 1 which are outside of the heat-treated volume 22 is below 400° C. The distance d of the 400° C. isotherm plane 21 to the peripheral thickness 6 is defined by the length of the line extending in a perpendicular direction from the peripheral thickness 6 to the 400° C. isotherm plane 21, as shown on FIG. 1. The depth D of the heat-treated volume 22 is defined by the maximum distance d of the 400° C. isotherm plane 21 to the peripheral thickness 6, as shown on FIGS. 1 and 2.

In a particular embodiment, the heat treatment operation is performed on only a part of the peripheral thickness 6 corresponding to a known critical area which presents risks of crack formation during forming of the steel blank 1. Advantageously, this will have the effect of improving the formability of said steel blank 1 by decreasing the risk of crack formation in said critical area, while ensuring a high productivity of the heat treatment operation because it is performed only on a focused region of said peripheral thickness 6.

In a particular embodiment, the heat treatment operation is performed on the entire surface of the peripheral thickness 6. In other words, the surface area of the heated peripheral portion 18 is equal to the surface area of the peripheral thickness 6. This will have the effect of improving the formability of said steel blank 1 by decreasing the risk of crack formation on the entire edge of said steel blank 1. Advantageously, this ensures that the subsequent forming process is very robust toward the risk of edge crack formation. For example, the risk of edge crack formation in case of variation of the stamping parameters or of deterioration of the forming tools will be reduced.

In an embodiment, the heat treatment operation comprises two or more heat treatment operations on the same heated peripheral portion 18. By doing so, the heat-treated zone 22 is submitted to a thermal cycle comprising a heating phase, a cooling phase and then one or more reheating and cooling phases. Such a heating cycle can advantageously lead to increased mechanical stress release and increased microstructural transformations within the heat-treated zone 22, which result in a further improvement of the formability of the steel blank 1 in said heat-treated zone 22.

In a particular embodiment, the heat treatment operation results in an increase of at least 50% of the hole expansion rate measured in the heat-treated zone 22, as compared to the hole expansion rate measured in the steel blank 1 outside of the heat-treated zone 22. Thanks to the release of residual stresses and thanks to the possible micro-structural transformations in the steel, the material within the heat-treated volume 22 has a lower sensitivity to the occurrence of cracks on the edges, which is measured by the hole expansion ratio.

It should be noted that the heat-treated volume 22 can take various shapes according to the type of heat source 16 which is used and according to the parameters of the heat treatment process. For example, in the case of a heat treatment performed by a single static heat source 16, as shown in FIG. 1, the isotherm planes 20 intersect the upper and lower faces 2 and 4 along lines which substantially define arcs of circle, therefore the outer surface of the heat-treated volume 22 is formed on one side by the surface formed by a portion of the peripheral thickness 6, on another side by the surface formed by a portion of the upper face 2 consisting of a portion of circle whose perimeter is the above described intersection of the 400° C. isotherm plane 21 with said upper face 2, on another side by the surface formed by a portion of the lower face 4 consisting of a portion of circle whose perimeter is the intersection of the 400° C. isotherm plane 21 with said lower face 4, and on a last side by a surface consisting of said 400° C. isotherm plane 21.

In the case of a heat treatment performed by a heat source 16 moving at a constant speed along a line having a direction substantially parallel to the upper and outer edges 8 and 10 of the steel blank 1 in the area facing said heat source 16, the isotherm planes 20 intersect the upper and lower faces 2 and 4 along lines which substantially define the arcs of an oval, having a short axis extending in a direction perpendicular to the upper and lower face edges 8 and 10 and a long axis extending in a direction substantially parallel to said upper and lower face edges 8 and 10. Accordingly, the ensuing shape of the outer surface of the heat-treated volume 22 is formed on one side by a portion of the peripheral thickness 6, on another side by a portion of the upper face 2 consisting of a portion of oval whose perimeter is the above described intersection of the 400° C. isotherm plane 21 with said upper face 2, on another side by a portion of the lower face 4 consisting of a portion of oval whose perimeter is the intersection of the 400° C. isotherm plane 21 with said lower face 4, and on a last side by a surface consisting of said 400° C. isotherm plane 21.

In a further example, when the heat treatment operation is performed by a moving heat source 16 travelling at a variable speed along a line having a direction substantially parallel to the upper and outer edges 8 and 10 of the steel blank 1 in the area facing said heat source 16, the heat-treated volume 22 has a shape which comprises bulges within the steel blank 1 in the areas of the heat-treated-volume 22 facing the areas of the peripheral heated portion 18 in which the heat source 16 has a lower speed. In other words, the distance d of the 400° C. isotherm plane to the peripheral thickness 6 in said bulges is greater than outside of said bulges. As a consequence, the depth D of the heat-treated volume 22 will necessarily be one of the distances d measured in one of said bulges.

The minimum temperature of the heat-treated volume 22 is set at 400° C. because below 400° C., the mechanical and metallurgical effects of the heat treatment do not have sufficiently high kinetics to be industrially applicable. In other words, below 400° C., the time necessary to efficiently relieve the residual stresses and to induce possible microstructural transformations within the steel is too high to warrant the use in an industrial process, which is expected to be productive and cost effective.

One characteristic of the present invention is that the maximum temperature of the heat-treated volume 22 does not exceed 1500° C. Indeed, above 1500° C., there is a risk that the steel blank 1 will locally melt, which will render it unfit for use.

Another characteristic of the present invention is that the entire volume of the steel blank 1 stays solid throughout the heat treatment operation. In other words, during the heat treatment operation, all points of the heat-treated volume 22 have a temperature which is below the melting point of said steel blank 1. More particularly, all points of the peripheral heated portion 18, which is the area of the heat-treated volume 22 which has the highest temperature, as was explained previously, stay below the melting point of the steel blank 1.

In a particular embodiment, the depth D of the heat-treated volume 22 is comprised within the range of 0.5 mm to 50.0 mm. For example, when the steel blank 1 is obtained by mechanical cutting, as described previously, it is known that the approximate penetration depth in the steel blank 1 of the work hardening effect induced by the mechanical cutting is approximately half the thickness t of the steel blank 1. Therefore, a depth D of the heat-treated zone 22 of 0.5 mm guarantees that the most severe area of the work hardening effect is included in the heat-treated zone 22. On the other hand, because the object of the heat treatment is to improve the formability on the edge of the steel blank 1 and not in the bulk of said steel blank 1, it is not necessary to perform a heat treatment operation resulting in the formation of a heat-treated volume 22 having a depth D higher than 50.0 mm. Furthermore, limiting the depth D limits the power expended by the heat source 16—it is therefore advantageous in terms of limiting the production costs and increasing the productivity to limit the depth D to 50.0 mm.

In a particular embodiment, the duration of the heat treatment is comprised in the range between 1 millisecond and 10 minutes. By duration of the heat treatment in any given point of the heated peripheral portion 18, it is meant the length of time during which the thermal energy Q of the heat source 16 is directed toward said given point of the heated peripheral portion 18. Because the mechanical and metallurgical reactions involved in the improvement of the formability by heat treatment do not occur instantly, it is recommended to allow for a minimum amount of 1 millisecond in order to ensure that the kinetics of the reactions can take place. On the other hand, in order to limit the power expended by the heat source 16 and thus to increase productivity and limit process costs, it is recommended to limit the duration of the heat treatment to a maximum of 10 minutes.

Figure 2:
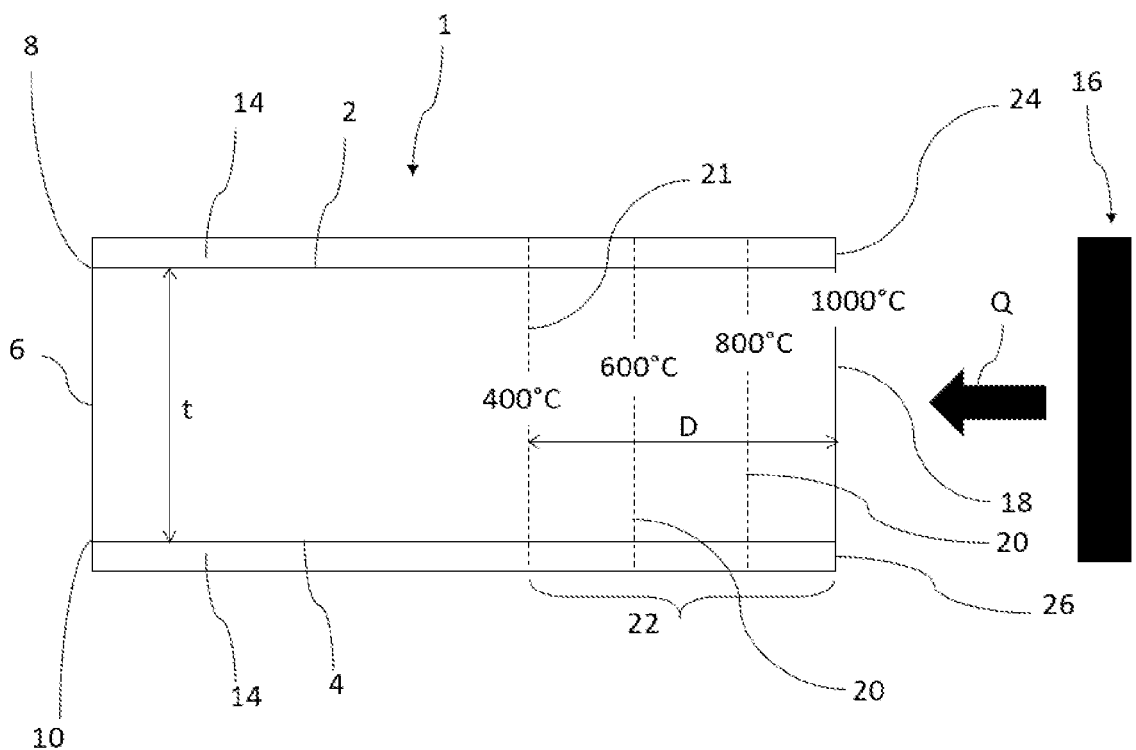
FIG. 2 is a cross section view along axis II-II of FIG. 1

In a particular embodiment, when the steel blank 1 bears a metallic coating 14 on at least part of its upper and/or lower face 2 and 4, the thermal energy Q of the heat source 16 will also be inevitably absorbed directly by a heated upper coating portion 24 of the metallic coating 14 on the upper face 2 located directly above the portion of the upper edge 8 comprised in the peripheral heated portion 18 and a heated lower coating portion 26 of the metallic coating 14 on the lower face 4 located directly below the portion of the lower edge 10 comprised in the peripheral heated portion 18, as depicted in FIGS. 1 and 2. In a preferred embodiment, the thickness of the metallic coating is significantly less, for example more than ten times less, than the thickness t of the steel blank 1 in the area of the peripheral heated portion 18. For example, the thickness of the coating is 20 microns in each of the heated upper and lower coating portions 24 and 26, while the thickness t of the steel blank 1 in the peripheral heated portion 18 is 1.0 mm, in which case the thickness t of the steel blank 1 is twenty-five times greater than the thickness of said heated upper and lower coating portions 24, 26. As a consequence, the surface area represented by the upper and lower coating portions 24 and 26 is significantly less, for example at least ten times less, than the surface area represented by the peripheral heated portion 18. Therefore, the thermal energy Q of the heat source 16 is mainly absorbed by the peripheral heated portion 18. This is advantageous from the point of view of productivity because the peripheral heated portion 18 is made of steel, which has a lower reflectivity than the metallic coatings used for corrosion protection. On the other hand, when using the heat treatment methods described in the prior art, in which the thermal energy is transmitted to a portion of the steel blank by the surface, i.e. the upper and/or lower faces of said steel blank, the full amount of the thermal energy will be absorbed by the metallic coating, thereby resulting in a significant loss of thermal efficiency of the process and therefore a loss in productivity and an increase in costs.

Also, when using a metallic coating 14 which has an evaporation point or a melting point which is lower than the maximum temperature reached inside the heat-treated volume 22, the heat treatment methods described in the prior art, which consist in directing a thermal energy toward the surface of the steel blank, will cause a significant amount of the metallic coating to evaporate or to melt in the heat-treated zone on the face of the steel blank toward which the thermal energy is directed because the metallic coating on said face is necessarily exposed to the highest temperatures of the heat-treated zone.

On the other hand, by applying the current invention, because the thermal energy Q is directed mainly to a surface area comprising steel, the amount of thermal energy Q directly absorbed by the metallic coating 14 will be far less important and therefore the surface area of the metallic coating 14 which reaches a temperature above the melting point and/or the evaporation point will be far less important. Therefore, the amount of evaporated and/or melted metallic coating 14 will be far less important, which is advantageous in terms of final part quality and corrosion protection.

In a particular embodiment, the thickness of the metallic coating 14 after heat treatment in the area covering the heat-treated zone 22 decreases by less than 30% as compared to the thickness of the metallic coating 14 in the areas not covering the heat-treated zone 22, as will be shown in the examples following the description of the method.

Figure 3:
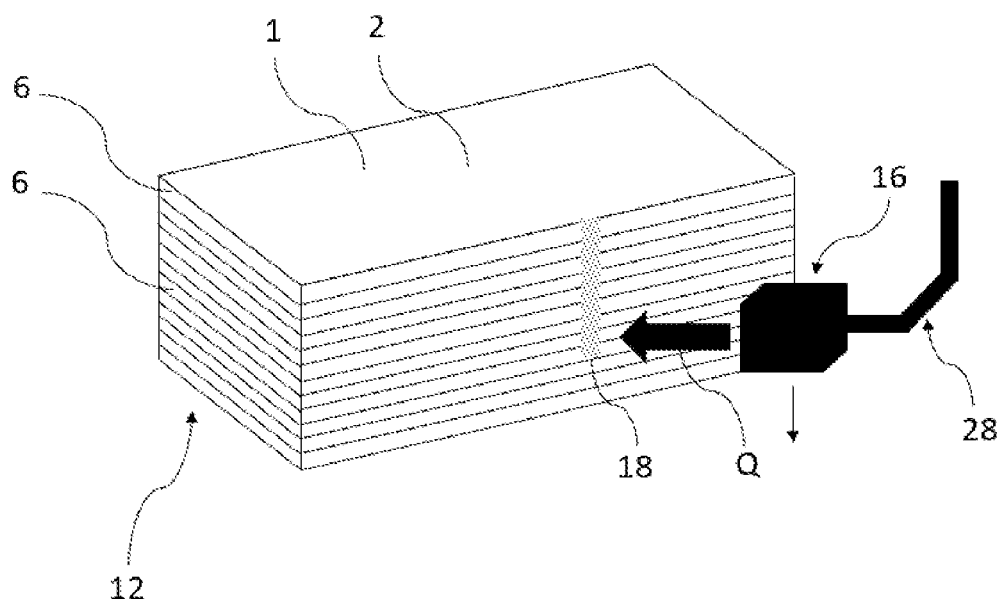
FIG. 3 is a perspective view of a stack of blanks to which the method is applied using as a heat source a moving defocused Laser beam emitted by a Laser head mounted on an industrial robot.
Figure 4:
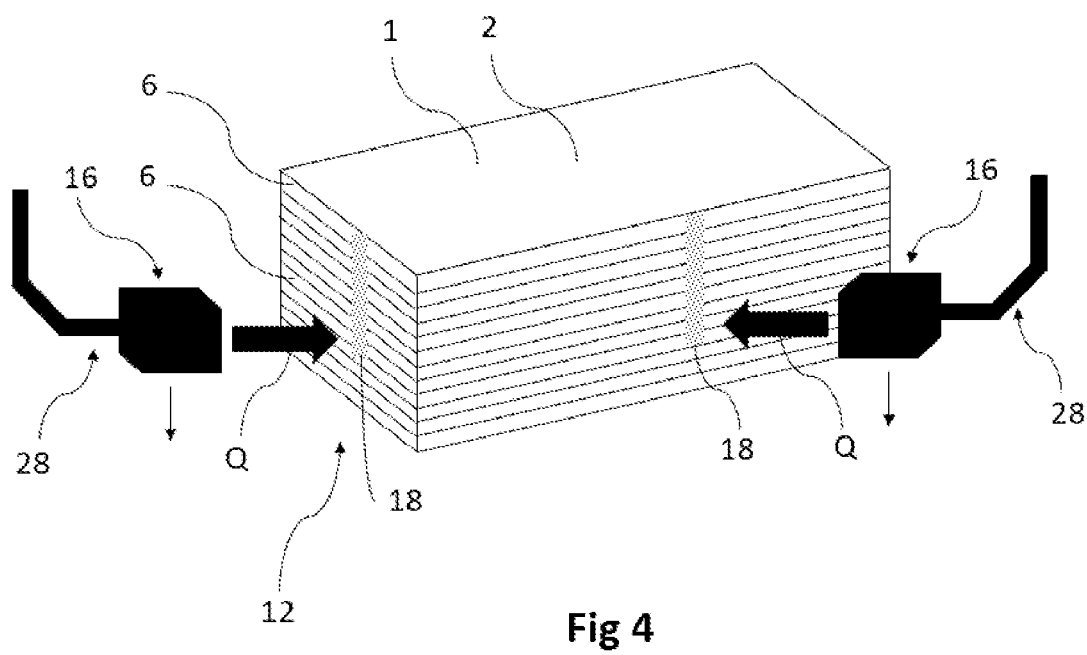
FIG. 4 is a perspective view of a stack of blanks to which the method is applied using several moving heat sources.
Figure 5:
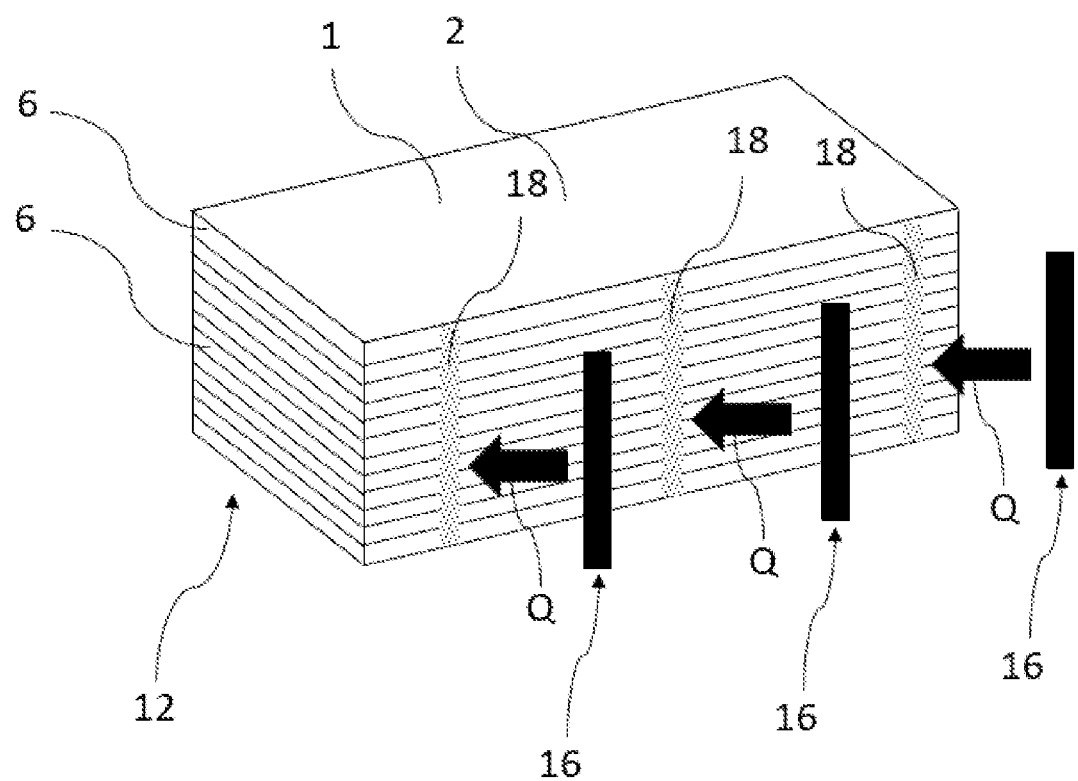
FIG. 5 is a perspective view of a stack of blanks to which the method is applied using an array of static infrared tubes applied to a static stack of blanks.

In a particular embodiment, as shown on FIGS. 3 to 5, the steel blanks 1 are stacked on top of each other to form a stack of blanks 12 before the heat treatment operation is performed. For example, the heat source 16 is travelling along a line perpendicular to the plane defined by the steel blanks 1. In other words, the heat source 16 scans the stack of blanks 12 from top to bottom or from bottom to top. Consequently, the peripheral heated portions 18 of each steel blank 1 comprising the stack of blanks 12 are aligned along a line spanning the stack of blanks 12 from top to bottom and perpendicular to the plane of the steel blanks 1. Advantageously, this embodiment allows to treat several steel blanks 1 in one batch without manipulating individual steel blanks 1, which represents a significant productivity gain and therefore a significant cost reduction. It should be noted that this embodiment can also be applied using several heat sources 16 to treat simultaneously several areas of the peripheral thickness 6 on a same steel blank 1, each heat source 16 scanning the stack of blanks 12 in order to treat in one batch several areas of the peripheral thickness 6 of all steel blanks 1 of said stack of blanks 12. It should be noted that when using the heat treatment methods described in the prior art, which consist in direction a heat source toward the surface of the steel blank, it is not possible to perform the heat treatment operation in one batch on a stack of blanks without manipulating the individual steel blanks because the heat source needs to be facing the surface of the steel blanks, and said heat source only has access to the top blank of a stack of blanks.

The heat source 16 is for example a Laser or an inductor or an infrared tube or any other type of heat source, providing it can create within the steel blank 1 a heat-treated volume 22 having a minimum temperature of 400° C., without exceeding a maximum temperature of 1500° C.

In a particular embodiment, a Laser is used as the heat source 16. The power of said Laser lies for example within the range of 500 W to 20 kW. The key parameter governing the absorption of the thermal energy Q by the peripheral heated portion 18 is the wavelength of said Laser. For steel, the heat absorption efficiency increases as the wavelength of said Laser decreases. For example, a wavelength of 1 micron or lower is recommended, which corresponds for example to a YAG, a disk, a fibre or a diode Laser. In a particular embodiment, the Laser head is arranged in such a way that the Laser beam impacts the peripheral heated portion 18 to form a defocused spot, i.e. the distance of the Laser head to the peripheral heated portion 18 is smaller or larger than the focal distance of said Laser. Advantageously, this enables to create a large peripheral heated portion 18 and thus to increase productivity and decrease production costs.

In another embodiment an inductor is used as the heat source 16. The power of said inductor is comprised for example in the range of 1 kW to 250 kW. The frequency of the inductor is the key parameter used to manage the depth D of the heated-treated zone 22. As the frequency increases the depth D of the heat-treated zone 22 decreases. For example, in the case of steel, for a frequency of 1000 Hz, the depth of the heated-treated zone 22 will be approximately 1.0 mm.

In a further embodiment, infrared heating is used as the heat source 16. The power of an individual heating element ranges for example from 1 kW to 100 kW. The key parameter governing the absorption of the thermal energy Q by the peripheral heated portion 18 is the wavelength of said infrared heating element. In the case of steel, the energy absorption will increase when going towards the lower wavelengths. The recommended wavelength is for example comprised in the range between 2 microns and 10 microns.

The heating technology is chosen according to the desired application and according to the available space and industrial equipment.

For example, if the area of the edge of the steel blank 1 to be heat-treated is very localized, for example if the size of the required peripheral heated portion 18 is less than 50 mm as measured along a line extending in the peripheral heat-treated portion 18 in a direction parallel to the upper and lower outer edges 8 and 10, a Laser treatment will be well adapted for example, because the Laser beam can be focused on a very precise zone. On the other hand, if a large area needs to be treated, for example if the size of the required peripheral heated portion 18 is more than 50 mm as measured along a line extending in the peripheral heat-treated portion 18 in a direction parallel to the upper and lower outer edges 8 and 10, then infrared heating will be well adapted, because the radiation heating of infrared tubes covers a large area and several tubes can be combined in series to provide the necessary amount of energy. However, this will take up a large space on the shop floor. Finally, if the amount of space available for the heat treatment operation is very limited, then a small induction heating on individual steel blanks 1 at the exit of the blanking line, before stacking the blanks on top of each other to form a stack of blanks 12, will be well adapted.

The heat treatment can be performed in static mode, in which case both the heat source 16 and the steel blank 1 are static during the heat treatment operation. It can also be performed in a dynamic mode, in which case there is a relative speed between the steel blank 1 and the heat source 16, either due to a movement of the steel blank 1 or a movement of the heat source 16 or a combined movement of both. The relative speed between the steel blank 1 and the heat source 16 is for example comprised in the range between 0.1 mm/s and 100 mm/s. The heat source 16 is for example mounted on an industrial robot 28, as depicted in FIGS. 3 and 4 in order to be set in motion.

For each specific industrial application, a specific process window can be defined using the following key parameters: the key parameters of the heating source 16 (type of heating source, power, wavelength or frequency for example), the size and geometry of the peripheral heated portion 18 and the relative speed between the heating source 16 and the steel blank 1 in case of a dynamic treatment or the heat treatment duration in case of static treatment. An analytical model can be designed to calculate the relationship between these parameters and determine the working process window for the particular industrial situation at hand. These process parameters will determine the temperature reached in the peripheral heated portion 18 and the depth D of the heat-treated volume 22.

In a particular embodiment, depicted in FIG. 3, the heat source 16 is a Laser directing the thermal energy Q through a Laser beam hitting the peripheral heated portion 18 of the steel blanks 1, said steel blanks 1 being stacked on top of each other to form a stack of blanks 12 and said heat source 16 is mounted on an industrial robot 28 in order to scan the stack of blanks 12 from bottom to top.

In another embodiment, depicted in FIG. 4, several heat sources 16 are used to simultaneously heat several peripheral heated portions 18 of steel blanks 1 stacked to form a stack of blanks 12. Said heat sources 16 are mounted on industrial robots 28 in order to scan the stack of blanks 12 from bottom to top.

In a further embodiment, depicted in FIG. 5, the heat sources 16 are an array of static infrared tubes. The heat treatment operation is performed in static mode. The steel blanks 1 to be treated are disposed in a stack of blanks 12 and said stack of blanks 12 is positioned in front of said heat sources 16. In this embodiment, each heat source 16 treats simultaneously the peripheral heated portions 18 of all the steel blanks 1 in the stack of blanks 12, thanks to the size of the heat sources 16, which is substantially equal to the height of the stack of blanks 12, as measured along a line perpendicular to the plane of the upper face 2 of the steel blanks 1.

The above described method presents multiple advantages, among which the possibility to significantly improve the formability of a steel blank close to its edge, without significantly evaporating its metallic coating in case of a coated steel blank, as will be demonstrated by the following examples.

Referring to table 1, a first example is given, in which the heat treatment is performed on a single steel blank 1 using a Laser beam as the heat source 16, which impacts the peripheral thickness 6 to form a defocused Laser spot in the heated peripheral portion 18. The heat treatment is performed in the static mode. Two different levels of tensile strengths of the steel blank 1 were tested. The performance of the heat treatment is measured by the evolution of the hole expansion ratio before and after the heat treatment operation, as defined by the standard ISO 16630:2017.

Table 1 reports the results along with the characteristics of the steel blanks 1, and the key parameters defining the heat source 16. The temperature field within the steel blank 1 was estimated using a series of thermocouples attached to the surface of the steel blank 1. The depth D of the heat-treated volume 22 is reported as well as the temperature reached in the peripheral heated portion 18. The temperature is shown as a temperature range of +/−20° C., which corresponds to the precision of the thermocouples used as measuring device.

As can be seen in table 1, the heat treatment of the steel blanks 1 has resulted in a significant increase of the hole expansion ratio in the heat-treated volumes 22. The hole expansion ratio is directly related to the sensitivity of the steel blank 1 toward the formation of cracks on the edge during forming. Indeed, the principle of the test itself is to deform the cut edge of a hole punched into the steel blank 1 and to monitor the formation of cracks on the edge during this deformation.

Furthermore, the evaporation rate of the metallic coating 14 in the heat-treated volume 22 is reported. Said evaporation rate is comprised between 0% and 20%, ensuring that the material remains partly coated and thus at least partly protected from corrosion on the portions of metallic coating 14 which cover the heat-treated volume 22. The significant difference in evaporation rate between the references I1 and I2 of Table 1 is due to the difference in the composition of the metallic coatings 14 of the steel blanks 1. Indeed, the metallic coating 14 in case of I1 is pure zinc, which has a melting point and an evaporation temperature which is lower than the metallic coating 14 in case of I4, which is an iron and zinc alloy comprising approximately 10% iron.

Referring to table 2, a second example of the application of the method of the present invention is given. In this case, the steel blank 1 is a shape blank used for the stamping of an automotive part. Said automotive part is susceptible to the formation of cracks during stamping in a given area, referred to as the critical area. The heat treatment operation was performed on the peripheral heated portion 18 of the steel blank 1 corresponding to the said critical area in the automotive part. The heat source 16 is a Laser forming a defocused Laser spot in the heated peripheral portion 18 and scanning a stack of blanks 12. The steel blanks 1 carry a metallic coating 14 made of pure Zinc. The efficiency of the method to reduce edge crack formation was evaluated by comparing the occurrence of edge cracks in the critical area after stamping of steel blanks 1 that had not undergone any heat treatment operation with the occurrence of edge cracks after stamping of steel blanks 1 that had undergone a heat treatment according to the method.

As can be seen in table 2, the edge crack issue faced in the critical area is solved by the implementation of the current invention. Furthermore, the evaporation rate of the metallic coating in the heat-treated area remains below 20%.

TABLE 1 example of heat treatment operations on steel blanks 1 with two different strength levels and metallic coatings 14

| Steel blank characteristics | | | metallic coating | | |
|---|---|---|---|---|---|
| Tensile strength (Mpa) | blank Thickness (mm) | martensite content (surface area %) | ferrite content (surface area %) | metallic coating composition and deposition method | metallic coating thickness per face | Heat treatment parameters Type of heat source |
| 620 | 1.7 mm | 5%-15% | 85%-95% | pure Zn - hot dip coating | 10 microns | YAG Laser |
| 809 | 1.5 mm | 15%-50% | 50%-85% | Zn—Fe alloy - hot dip coating | 10 microns | YAG Laser |

| Heat treatment parameters | | | | Results | |
|---|---|---|---|---|---|
| Power of the heat source | Heat treatment duration | Maximum Temperature reached in the heat-treated zone | Depth of the heat treated zone | % evaporation of metal coating (in weight %) in the areas covering the heat-treated zone | Increase in hole expansion ratio in the heat-treated zone |
| 2000 W | 1.5 s | 690° C.-730° C. | 2.0 mm | 15-20% | (+) 100% |
| 2000 W | 1.5 s | 690° C.-730° C. | 2.0 mm | 0% | (+) 200% |

TABLE 2 example of a heat treatment operation on a stack of blanks 12.

| Steel blank characteristics | | | | metallic coating | | Heat treatment parameters | | |
|---|---|---|---|---|---|---|---|---|
| Tensile strength (Mpa) | Thickness (mm) | martensite content (surface area %) | ferrite content (surface area %) | composition and deposition method | metallic coating thickness per face | Type of heat source | Power of the heat source | Number of blanks per stack |
| 620 | 1.7 mm | 5%-15% | 85%-95% | pure Zn - hot dip coating | 10 microns | YAG Laser | 3000 W | 9 |

| Heat treatment parameters | | | Results | | |
|---|---|---|---|---|---|
| Heat treatment duration | Maximum Temperature reached in the heat-treated zone | Depth of the heat-treated zone | % evaporation of metal coating (in weight %) in the areas covering the heat-treated zone | % occurrence of cracks without heat treatment operation | % occurrence of cracks with the heat treatment operation |
| 3.2 s | 690° C.-730° C. | 2.8 mm | 15-20% | 100% | 0% |

The invention claimed is:

1. A method to improve a formability of a steel blank, the method comprising the steps of:
   providing a steel blank having a zinc based metallic coating on at least a portion of an upper face or a lower face, a microstructure containing, in area percentage, 5% to 50% martensite and 50% to 95% ferrite, and an ultimate tensile strength of at least 500 MPa,
   performing a heat-treatment operation on the steel blank having the zinc based metallic coating by directing a thermal energy Q provided by at least one heat source on a part of a peripheral thickness of the steel blank to form a peripheral heated portion and a heat-treated volume, the peripheral heated portion being part of the heat-treated volume, the temperature of the heat-treated volume being greater than 400° C. and less than or equal to 730° C., wherein an entire volume of the steel blank stays solid during the heat-treatment operation, and wherein a thickness of the metallic coating after heat treatment in the heat-treated volume decreases by less than 30% as compared to a thickness of the metallic coating outside the heat-treated volume, and wherein hole expansion ratio measured in the heat-treated volume is at least 50% higher than hole expansion ratio measured in the steel blank outside of the heat-treated volume.

2. The method as recited in claim 1 wherein a depth of the heat-treated volume is within the range of 0.5 mm to 50.0 mm.

3. The method as recited in claim 1 wherein a duration of the heat treatment is between 1 millisecond and 10 minutes.

4. The method as recited in claim 1 wherein several steel blanks are piled in a stack of blanks and are heat-treated as a batch by at least one heat source.

5. The method as recited in claim 1 wherein the steel blank is heat-treated individually.

6. The method as recited in claim 1 wherein the heat source is moving and the steel blank is static.

7. The method as recited in claim 1 wherein the heat source is static and the steel blank is moved in front of the heat source.

8. The method as recited in claim 1 wherein the heat source and the steel blank are both static.

9. The method as recited in claim 1 wherein the heat source is directed toward the peripheral heated portion at a same location at least twice.

10. The method as recited in claim 1 wherein an entire surface forming the peripheral thickness is heat-treated by the at least one heat source.

11. The method as recited in claim 1 wherein the at least one heat source includes a laser emitting a defocused laser beam and mounted on an industrial robot.

12. The method as recited in claim 1 wherein the at least one heat source includes an array of static infrared tubes, in front of which the steel blanks are moved.

13. The method as recited in claim 1 wherein the heat-treated volume has a shape which is defined by an isotherm plane intersecting the upper face and the lower face along a line which substantially define an arc of a circle and forming an intersection of the isotherm plane with the upper face and an intersection of the isotherm plane with the lower face.

14. The method as recited in claim 13 wherein an outer surface of the heat-treated volume is formed on one side by a surface formed by a portion of the peripheral thickness, on another side by a surface formed by a portion of the upper face consisting of a portion of the circle whose perimeter is the intersection of the isotherm plane with the upper face, on another side by a surface formed by a portion of the lower face consisting of a portion of the circle whose perimeter is the intersection of the isotherm plane with the lower face, and on a last side by a surface consisting of the isotherm plane.

15. The method as recited in claim 1 wherein the heat-treated volume has a shape which is defined by an isotherm plane intersecting the upper face and the lower face along a line which substantially define an arc of an oval and forming an intersection of the isotherm plane with the upper face and an intersection of the isotherm plane with the lower face.

16. The method as recited in claim 13 wherein an outer surface of the heat-treated volume is formed on one side by a surface formed by a portion of the peripheral thickness, on another side by a surface formed by a portion of the upper face consisting of a portion of the oval whose perimeter is the intersection of the isotherm plane with the upper face, on another side by a surface formed by a portion of the lower face consisting of a portion of the oval whose perimeter is the intersection of the isotherm plane with the lower face, and on a last side by a surface consisting of the isotherm plane.

17. The method as recited in claim 1 wherein the heat-treated volume has a shape which comprises bulges.

18. The method as recited in claim 1, wherein the at least one heat source includes a laser with a power within the range of 500 W to 20 kW and a wavelength of 1 micron or lower, a depth of the heat-treated volume is within the range of 0.5 mm to 50.0 mm, and a duration of the heat treatment is between 1 millisecond and 10 minutes.

* * * * *